2 Sheets—Sheet 1.

W. L. HUNT.

Theater Appliance.

No. 9,374. Reissued Sept. 7, 1880.

Attests

J. M. Davies Jr.

Inventor

William L. Hunt

By his atty

[illegible]

N. PETERS, PHOTO-LITHOGRAPHER, WASHINGTON, D. C.

2 Sheets—Sheet 2.

W. L. HUNT.

Theater Appliance.

No. 9,374. Reissued Sept. 7, 1880.

Attests

J. M. Davies Jr.

Inventor

William L. Hunt

By his atty.

N. PETERS, PHOTO-LITHOGRAPHER, WASHINGTON, D. C.

UNITED STATES PATENT OFFICE.

WILLIAM L. HUNT, OF WESTMINSTER, ENGLAND.

THEATER APPLIANCE.

SPECIFICATION forming part of Reissued Letters Patent No. 9,374, dated September 7, 1880.

Original No. 214,663, dated April 22, 1879. Patented in England December 18, 1875. Application for reissue filed April 21, 1880.

*To all whom it may concern:*

Be it known that I, WILLIAM L. HUNT, of Westminster, in the county of Middlesex, England, have invented new and useful Improvements in Theater Appliances, of which the following is a specification, reference being had to the accompanying drawings, which form part thereof.

This invention relates to mechanism which is designed to propel a performer through the air; and it consists in combining suitable frame-work, platform, and springs with a cylindrical casing or chamber of a cannon or gun, and a tube, cylinder, or other receptacle situated within said cannon containing a sufficient quantity of powder, and the whole so arranged and operated that immediately before, after, or during the explosion of the powder the platform is released and the performer is propelled from the cannon into the air, so that at substantially the same time the explosion gives a loud report, thereby creating a belief that a real cannon is employed, and that the motive power is powder.

Figure 1:
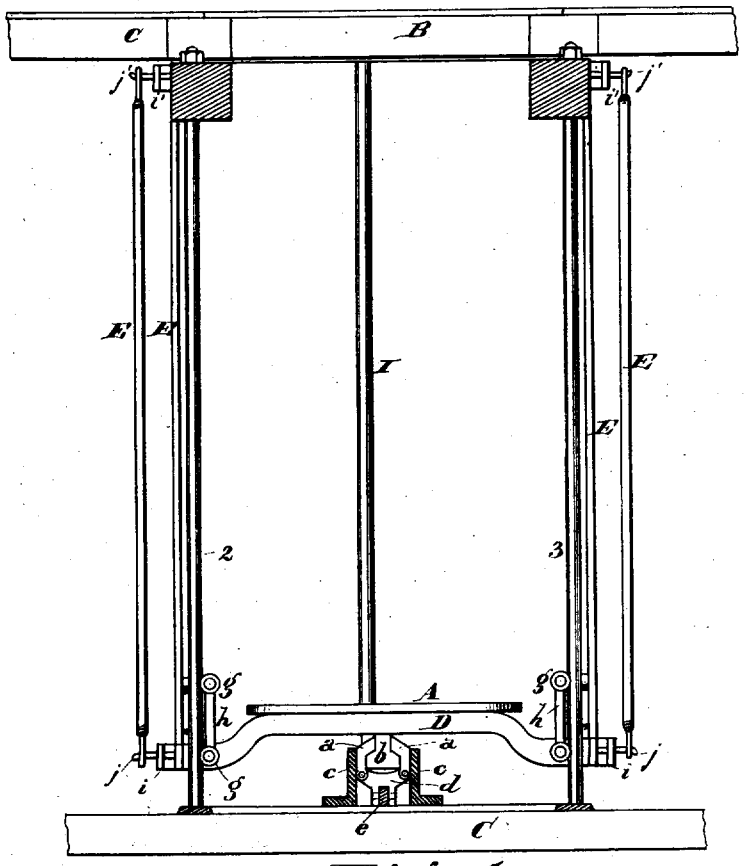
Figure 2:
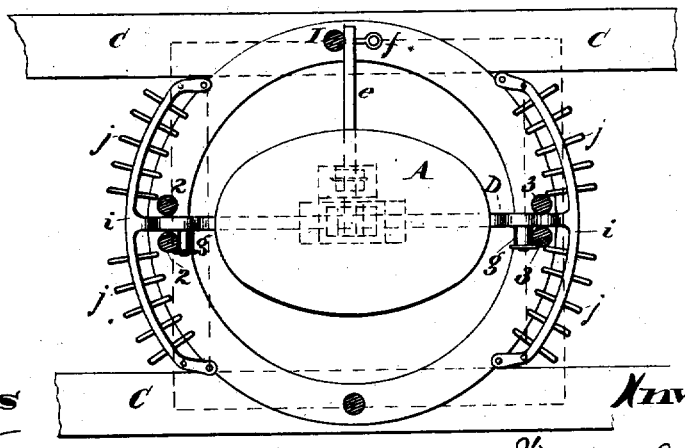
Figure 3:
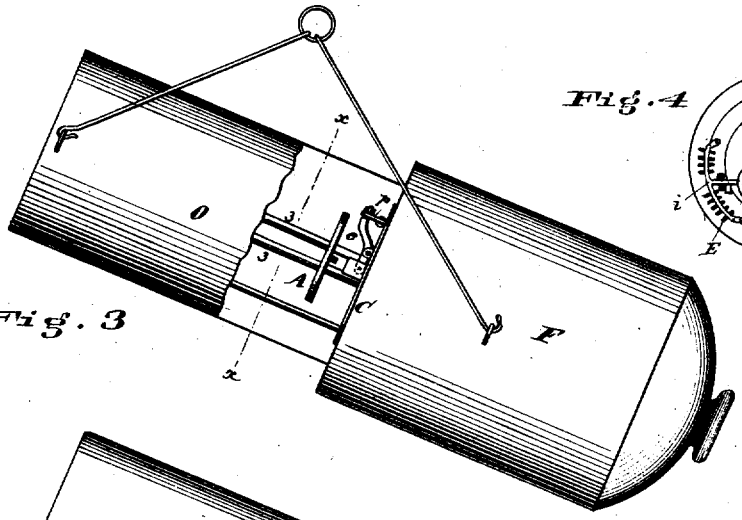
Figure 4:
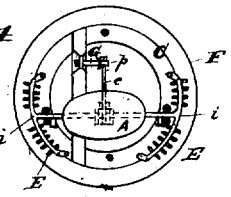
Figure 5:
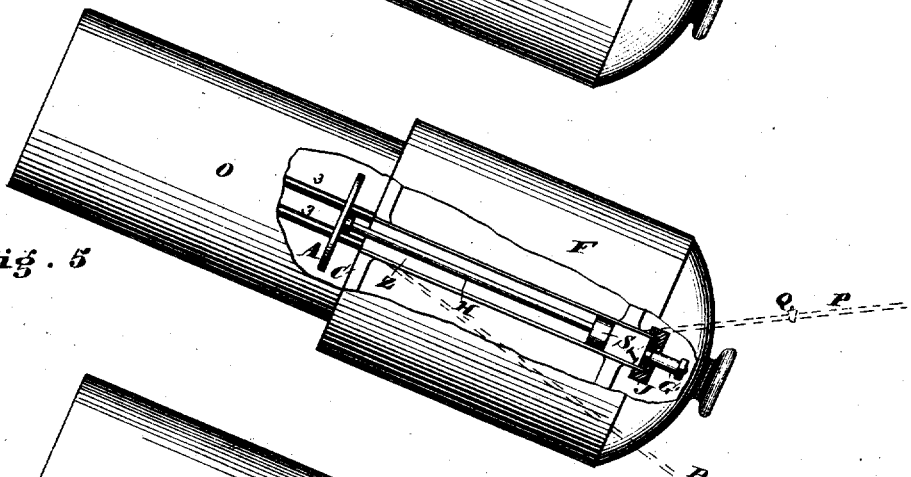
Figure 6:
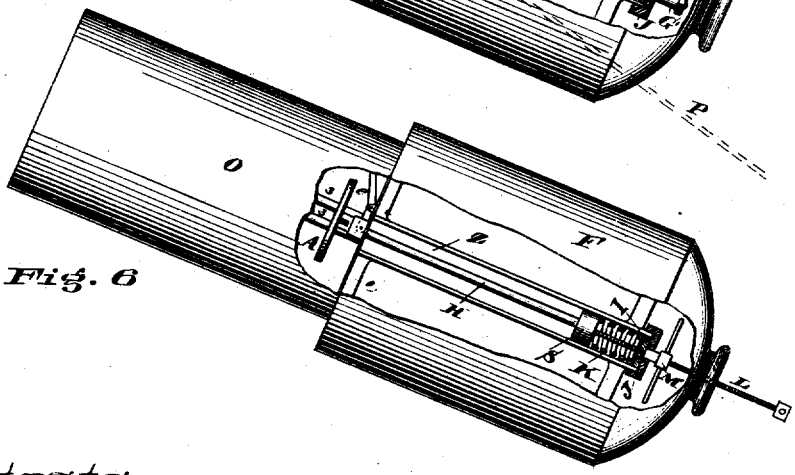

In the drawings, Figures 1 and 2 are substantially similar to apparatus patented to me June, 1871. Fig. 1 is a sectional elevation, and Fig. 2 is a sectional plan view, of one part of my invention. Figs. 3 and 4 are views showing the mechanism shown in Figs. 1 and 2 arranged within a cannon-shaped shell. Figs. 5 and 6 show modified forms of apparatus.

A is the inner platform, on which stands the gymnast or other performer to be projected upward through the opening B in the stage or mouth of the cannon. This platform is shown in its lowest position and ready for action, and is there locked by two hinged jaws, *a a*, the hooked ends of which gripe or take hold into two beveled recesses or slots formed on the sides of a stud or head, *b*, attached to the under side of the platform A. When in this position they are prevented from spreading apart on their hinges by the sides of an open socket-piece, *c*, secured vertically to the lower part of the frame-work C.

The jaws *a a* are hinged to the arms of a Y or other shaped connecting-piece, *d*, which is connected at its lower end with the short arm of a lever, *e*, the long arm of which passes out at the side of the frame-work, where it rests (when the platform A is in its lowest position, as shown) upon a rod or bolt, *f*, which is inserted into the upright standard I of the frame-work C, and is formed with a handle for removing it therefrom when required.

The platform A is secured to or carried at its under side by a bar, D, each end of which passes between the two upright pillars or rods 2 2 and 3 3, respectively, on each side of frame-work C, where it is provided with rollers *g g*, mounted in suitable frames *h h* and working against the rods 2 2 and 3 3, so as to guide the bar D and platform A in their ascent; or these guides may be in the form of sockets formed at the ends of the bar D and sliding over the said rods, or they may be arranged in any other manner that may be found most suitable.

On the upper ends of the pillars or rods 2 2 and 3 3 are rubber or other buffers for deadening the shock occasioned by the rapid ascent of the platform, as hereinafter described.

The bar D terminates at each end outside the upright pillars or rods 2 2 and 3 3 with a curved shaped bar or circular ring, *i*, carrying pins or hooks *j j*, immediately over which are similar curved bars or rings *i' i'*, secured to the under side of the top portion of the frame-work C and carrying pins or hooks *j'* and *j'*. Between the pins *j* and *j'* the india-rubber or other springs E are stretched or extended, and the whole apparatus is ready for use.

The gymnast or other performer being stationed on the platform A, and it being desired to project him or her upward, the bolt *f* is withdrawn by means of its handle from the frame or upright standard I of the frame-work C and from under the long arm of the lever *e*, which, being now unsupported, drops down, the tension of the extended springs E, acting upon the stud or head *b* on the under side of the platform A, pulls the jaws *a a* up out of the socket *c*, and the said jaws, spreading open on their hinges, release the platform A, which instantly flies upward in obedience to the action of the springs E, and projects the gymnast or performer as desired.

I will now proceed to describe another part of my invention, (shown in Figs. 3 and 4.) In this arrangement the apparatus may be similar to that shown in Figs. 1 and 2, (except that the locking-bolt *f* is dispensed with,) and is inclosed in a cylindrical chamber or casing, O, of the cannon or gun F, which is suspended from the roof or other convenient part of the place of exhibition, or set upon a carriage or ground and arranged at any desired angle by rods or chains.

A method of causing an explosion of gunpowder simultaneously with the projection of the performer is as follows: On the end of the long arm of lever *e* is hinged a short arm, *p*, which, when the platform is in its lowest position, as shown, is turned down vertically with the lever *e*, so that its end bears hard upon the lower portion of the frame-work C, thereby preventing the tension of the springs E from forcing down the long arm of the lever *e*, and so releasing the platform A. The lower end of the arm *p* may be flattened out or enlarged, so as to cover and be in contact with the mouth of a short tube, cylinder, or bomb, G, which is carried by a bracket secured to the lower portion of the frame-work C and charged with powder; or, if preferred, in lieu of flattening or enlarging the end of the arm *p*, a cup-shaped piece may be fixed thereto, so as to fit over the mouth of the tube or cylinder G.

A gymnast or other performer having assumed an inclined position inside the chamber O of the cannon or gun F, with his or her feet bearing against the inner platform, A, and it being desired to project him or her from the gun, the powder contained in the tube, cylinder, or bomb G is ignited by a match or fuse, or by percussion or electricity, and the arm *p* of the lever *e* being driven away from its vertical position by the gases generated in G releases the long arm of the lever *e* and platform A, which instantly flies outward toward the mouth of the cannon or gun F, and the gymnast or other performer is thereby projected from the cannon into the air, and with the explosion of gunpowder at the same time, as desired.

In case the powder does not act, owing to dampness or other unexplained cause, provision is made for igniting it by means of electricity acting along wires in connection with the tube or cylinder G, a spark being thereby caused which ignites a quantity of fine dry powder in communication with that contained in the tube or cylinder G, and which is rapidly discharged thereby.

Figs. 5 and 6 show modified forms of apparatus designed to project the performer from the cannon, and which are combined at will with the auxiliary mechanism to cause the explosion of gunpowder, to create the impression that the performer is shot out or projected by gunpowder, and which combination of apparatus and mechanism constitutes the essence of my invention. In these cases the rear part of the cannon F is furnished with a cylinder or tube, Z, in which a piston, S, slides. This piston S is attached to the under side of the platform A by a rod, H.

The tube Z may be furnished with a coil-spring, K, which presses against the piston S, and when in a compressed state or condition, as shown in Fig. 6, should the long end of the lever *e*, or its equivalent, be free to move, the spring K will force the platform A up, projecting the performer into the air and from the cannon-mouth. To draw the platform to its operating position a screw, L, and nut M may be used.

In place of using springs, as last described, the performer can be projected by compressed air or steam admitted through pipes P P′, and acting on the piston S in cylinder Z, and at the same instant that the performer is projected from the cannon an explosion of gunpowder takes place through the agency of suitable mechanism, whose operation depends upon the movement of the platform.

It will be understood that the particular ejecting apparatus is immaterial, and also that various kinds of catches may be employed, the essential feature of the invention being the releasing of the platform to project a performer, and the explosion of powder situated within said cannon at or about the same time.

If desired, the platform may be released by hand, and in its upward movement may act on, by suitable mechanism, and explode a bomb or gunpowder within the cannon.

It is not necessary to my invention that the explosion of the gunpowder should release the platform, for the same object would be attained if the platform were released by any other suitable means, and said platform in its ascent caused the explosion of the gunpowder or bomb, since my whole invention is for suitable mechanism which propels a performer from the mouth of a cannon-shaped shell, in combination with mechanism in said shell which causes an explosion of gunpowder or its equivalent at substantially the same time, thereby creating the impression that the performer was propelled into the air from a real cannon and by the explosion of gunpowder.

Having now described my invention, what I claim as new, and desire to secure by Letters Patent, is—

1. The combination of a cylinder open at one end to form the mouth, a platform movable in said cylinder to and from the mouth, a spring or springs attached to said platform and acting thereon to force the platform toward the mouth, a latch or catching mechanism to hold the platform down against the pressure of the springs, and a chamber in relation to the catching mechanism, so that an explosion in said chamber will release the platform from the catching mechanism, substantially for the purpose specified.

2. A theater appliance for propelling a performer into the air, and at or about the same time causing an explosion of gunpowder to take place within the chamber of the cannon, giving the impression that the performer has been propelled by the explosion of the powder within the cannon, and consisting of a cylinder in shape representing a cannon, open at one end to form the mouth, a platform movable in said cylinder to and from the mouth, a spring or springs acting upon said platform to force the same to the mouth, a latch or catching mechanism to hold the platform down against the pressure of the springs, and mechanism to cause an explosion of gunpowder at or about the time the platform propels the performer into the air, substantially for the purpose specified.

3. In a theater appliance, mechanism to cause a performer to be propelled into the air, in combination with auxiliary mechanism independent of the motive power to cause an explosion of gunpowder to take place, all constructed and arranged within a cylindrical shell in shape representing a cannon, and adapted to be operated in such a manner that the explosion shall take place simultaneously, or nearly so, with the action of the mechanism which propels the performer into the air.

In testimony of which invention I hereunto set my hand.

WM. L. HUNT.

Witnesses:
ALBERT E. ZACHERLE,
A. HARRIS.